United States Patent
Johnson

(10) Patent No.: US 7,339,629 B2
(45) Date of Patent: Mar. 4, 2008

(54) METHOD AND SYSTEM FOR TIME CONSTANT FOR A 3D COMB FILTER

(75) Inventor: Shawn V. Johnson, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 530 days.

(21) Appl. No.: 10/943,587

(22) Filed: Sep. 17, 2004

(65) Prior Publication Data
US 2005/0168647 A1    Aug. 4, 2005

Related U.S. Application Data

(60) Provisional application No. 60/540,890, filed on Jan. 30, 2004.

(51) Int. Cl.
*H04N 9/78* (2006.01)
(52) U.S. Cl. ........... 348/665; 348/667
(58) Field of Classification Search ........ 348/663–670; H04N 9/78
See application file for complete search history.

(56) References Cited

U.S. PATENT DOCUMENTS

| | | | | |
|---|---|---|---|---|
| 5,006,927 A | * | 4/1991 | Creed et al. | 348/665 |
| 5,990,978 A | * | 11/1999 | Kim et al. | 348/663 |
| 6,674,488 B1 | * | 1/2004 | Satoh | 348/663 |
| 6,774,954 B1 | * | 8/2004 | Lee | 348/665 |

* cited by examiner

*Primary Examiner*—M. Lee
(74) *Attorney, Agent, or Firm*—McAndrews, Held & Malloy, Ltd.

(57) ABSTRACT

Methods and systems for time constant for a 3D comb filter of a video signal are provided. Aspects of the method may include assigning a weight to a 3D comb mesh value. Combing may be blended according to the assigned weight of the 3D comb mesh value. The weighted 3D comb mesh value may be accumulated in order to generate accumulated mesh value. If the accumulated mesh value exceeds a saturation value, the accumulated mesh value may be reduced to the saturation value. If the 3D comb mesh value is smaller than a first threshold value, the accumulated mesh value may be reset to zero. A multiplier may be generated according to the accumulated mesh value. If the accumulated mesh value is between a second threshold value and a third threshold value, the multiplier may be blended.

75 Claims, 16 Drawing Sheets

METHOD AND SYSTEM FOR TIME CONSTANT FOR A 3D COMB FILTER

CROSS-REFERENCE TO RELATED APPLICATIONS/INCORPORATION BY REFERENCE

This patent application makes reference to, claims priority to and claims benefit from U.S. Provisional Patent Application Ser. No. 60/540,890, entitled "METHOD AND SYSTEM FOR TIME CONSTANT FOR A 3D COMB FILTER," filed on Jan. 30, 2004, the complete subject matter of which is hereby incorporated herein by reference, in its entirety.

This application makes reference to:
U.S. application Ser. No. 10/943,267 filed Sep. 17, 2004;
U.S. application Ser. No. 10/943,587 filed Sep. 17, 2004;
U.S. application Ser. No. 10/943,593 filed Sep. 17, 2004;
U.S. application Ser. No. 10/943,596 filed Sept. 17, 2004;
U.S. application Ser. No. 10/869,395 filed Jun. 16, 2004; and
U.S. application Ser. No. 10/943,641 filed Sep. 17, 2004.

The above stated applications are hereby incorporated herein by reference in their entirety.

FIELD OF THE INVENTION

Certain embodiments of the invention relate to processing of video signals. More specifically, certain embodiments of the invention relate to a method and system for time constant for a 3D comb filter of a video signal.

BACKGROUND OF THE INVENTION

A composite video signal is the sum of a luminance (brightness) signal and a chrominance (color) signal. These signals may be referred to as luma and chroma signals, respectively. The frequency ranges of the luma and chroma signals are designed to overlap. In video processing, the luma and chroma signal components are added together in order to generate a composite video signal. The luma and chroma video elements are integrated and broadcasted as a single composite video stream. Once the broadcasted composite signal is received, the luma and chroma signal components must be separated in order for the video signal to be processed and displayed. A comb filter may be utilized for separating the chroma and luma video signal components. For example, a television may be adapted to receive a composite video input and utilize an integrated comb filter to separate the chroma and luma video signal components. However, before the television can display the received video signal, the chroma and luma video components have to be separated.

FIG. 1 is a diagram illustrating generation of a conventional composite video signal. Referring to FIG. 1, a conventional composite video signal 105 may be generated from a luma component 103 and a chroma component 101. The composite video signal 105 may be generated by adding the chroma video signal component 101 and the luma video signal component 103. The chroma signal component 101 may be modulated at 3.58 megahertz and it may or may not comprise a constant chroma across the entire line. The luma signal component 103 may increase in amplitude in a stair step fashion or it may not.

FIG. 2A is a diagram illustrating modulated chroma signals in contiguous composite video frames. The chroma component may be modulated so that a frequency of each successive line of video may be phase-shifted by 180 degrees with respect to the previous line. Referring to FIG. 2A, the previous frame 201 may comprise a previous line 203, a current line 205, and a next line 207. Similarly, the current frame 209 may comprise a previous line 211, a current line 213, and a next line 215. The current line 213 in the current frame 209 may be phase-shifted by 180 degrees from the previous line 211 in the current frame 209, as well as from the next line 215 in the current frame 209. Similarly, the current line 205 in the previous frame 201 may be phase-shifted by 180 degrees from the previous line 203 in the previous frame 201, as well as from the next line 207 in the previous frame 201. In addition, since frames in the contiguous composite video signal are at a frequency rate of 59.94 Hz, there may be a 180-degree phase shift between two adjacent frames, for example, the current frame 209 and the previous frame 201. Correspondingly, the current line 213 in the current frame may be 180 degrees phase-shifted from the current line 205 in the previous frame 201.

In conventional video processing, there are three ways to separate the luma and chroma video components and these include combing horizontally, combing vertically, and combing temporally. During separation of the luma and chroma components, there are three bandwidth directions that may incur losses in the separation process and in the separated signal. Depending on the combing method that is utilized, the separated signal may have reduced vertical bandwidth, horizontal bandwidth, and/or temporal bandwidth.

The first way to separate the luma and chroma-video components is by horizontal combing. Horizontal combing may be accomplished by utilizing a notch filter, for example. Since the chroma signal component in a composite video signal may be modulated at 3.58 MHz, a notch filter set at 3.58 MHz may be utilized. Combing vertically may also be utilized to separate the luma and chroma video components. Combing vertically may be achieved in three different ways—the current line may be combed with the previous and the next line, the current line may be combed with the line just before it, or the current line may be combed with the line just after it. The vertical combing is performed spatially, which involves combing only within one field at a time and without any temporal combing.

During combing in the current frame 209, for example, if the current line 213 is added to the previous line 211, the chroma content may cancel out and two times the luma content may be obtained. On the other hand, if the previous line 211 is subtracted from the current line 213, the luma content may cancel out and two times the chroma content may be obtained. In this way, luma and chroma content may be separated from the composite video signal for further processing. However, vertical combing may result in a reduced vertical bandwidth.

A third way to comb a composite signal is to comb temporally. Combing temporally comprises combing between two adjacent frames, for example, the current frame 209 and the previous frame 201. Further, temporal combing may be characterized by a reduced temporal bandwidth. Luma and chroma content may be separated by utilizing the same addition and subtraction method between a current line and a previous line as it was utilized with vertical combing.

FIG. 2B is a diagram illustrating combing of a correlated current line 224 and a previous line 222 in a current frame 220. In this case, there is no vertical bandwidth and the previous line 222 and the current line 224 are perfectly correlated. The current line 224 may be added with the previous line 222 and two times luma may be obtained. Similarly, the previous line 222 may be subtracted from the current line 224 so that two times chroma may be obtained.

FIG. 2C is a diagram illustrating combing of a non-correlated current line 234 and a previous line 232 in a current frame 230. In this case, there may be significant vertical bandwidth. The vertical bandwidth may be high enough so that there may be no correlation between the current line 234 and the previous line 232. When the current line 234 and the previous line 232 are combed together, there may be significant error in both the luma and chroma. This may produce combing artifacts in the obtained combed video signal. A substantially the same result may be obtained when combing temporally when there is temporal bandwidth, which indicates motion. Higher bandwidth in a given direction may cause combing in that direction to result in more incorrectly separated luma and chroma.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain aspects of the invention may be found in a method and system for combing a video signal. A weight may be assigned to a 3D comb mesh value and combing may be blended according to the assigned weight of the 3D comb mesh value. The weighted 3D comb mesh value may be accumulated in order to generate an accumulated mesh value. If the accumulated mesh value exceeds a saturation value, the accumulated mesh value may be reduced to the saturation value. If the 3D comb mesh value is smaller than a first threshold value, the accumulated mesh value may be reset to zero. A multiplier may be generated according to the accumulated mesh value. If the accumulated mesh value is between a second threshold value and a third threshold value, the multiplier may be blended. Blending of the multiplier may be varied over a determined range between the second threshold value and the third threshold value. If the accumulated mesh value is at most equal to the second threshold value, the multiplier may be set to zero. If the accumulated mesh value is at least equal to the third threshold value, the multiplier may be set to one. Combing may be blended according to the blended multiplier and the 3D comb mesh value. If the multiplier is zero, 3D combing may be disabled. If the multiplier is one, the video signal may be 3D combed according to the 3D comb mesh value.

Another aspect of the invention may provide a machine-readable storage, having stored thereon, a computer program having at least one code section executable by a machine, thereby causing the machine to perform the steps as described above for combing a video signal.

The system for combing a video signal may include at least one processor that assigns a weight to a 3D comb mesh value and blends combing according to the assigned weight of the 3D comb mesh value. A first circuitry may accumulate the weighted 3D comb mesh value to generate accumulated mesh value. If the accumulated mesh value exceeds a saturation value, second circuitry may reduce the accumulated mesh value to the saturation value. If the 3D comb mesh value is smaller than a first threshold value, reset circuitry may reset the accumulated mesh value to zero. Third circuitry may generate a multiplier according to the accumulated mesh value. If the accumulated mesh value is between a second threshold value and a third threshold value, the third circuitry may blend the multiplier. The third circuitry may vary blending over a determined range between the second threshold value and the third threshold value. If the accumulated mesh value is at most equal to the second threshold value, the third circuitry may set the multiplier to zero. If the accumulated mesh value is at least equal to the third threshold value, the third circuitry may set the multiplier to one. The processor may blend combing according to the blended multiplier and the 3D comb mesh value. If the multiplier is zero, the processor may disable 3D combing. If the multiplier is one, the processor may 3D comb according to the 3D comb mesh value. The third circuitry may comprise an estimation circuitry. The second circuitry may comprise a saturation circuitry. The first circuitry may comprise an adder.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for combing a video signal. During separation of the chroma and luma signal components, a 3D comb mesh value may be generated. The 3D comb value may indicate, for example, to what extent a composite video signal may be 3D and 2D combed. A 3D comb mesh value may be generated by a unidirectional or bidirectional 3D comb filter. A unidirectional comb filter is more fully described in U.S. patent application Ser. No. 10/943,267, filed Sep. 17, 2004, entitled "Method and System for 3D Comb Filtering of a Video Signal," which is incorporated herein in its entirety. A bidirectional comb filter is more fully described in U.S. patent application Ser. No. 10/943,593, filed Sep. 17, 2004, entitled "Method and System for 3D Bidirectional Comb Filtering," which is incorporated herein in its entirety.

A weight may be assigned to the 3D comb mesh value and combing may be blended according to the assigned weight of the 3D comb mesh value. The weighted 3D comb mesh value may be accumulated in an accumulator. If the 3D comb mesh value is smaller than a determined first threshold, then the accumulator may be reset. Accumulated 3D comb mesh value from the accumulator may not be allowed to exceed a saturation value S. If the accumulated mesh value exceeds S, then the accumulated mesh value may be set to S. A multiplier may be generated according to the accumulated mesh value. If the accumulated mesh value is at most a second threshold, then the multiplier may be set to zero and 3D combing may be disabled. If the accumulated mesh value is at least a third threshold, then the multiplier may be set to one and 3D combing may be allowed in accordance with the 3D comb mesh value. If the accumulated mesh value is between the second and third threshold values, the multiplier may be blended. The 3D comb mesh value may then be blended in accordance with the blended multiplier.

Figure 1:
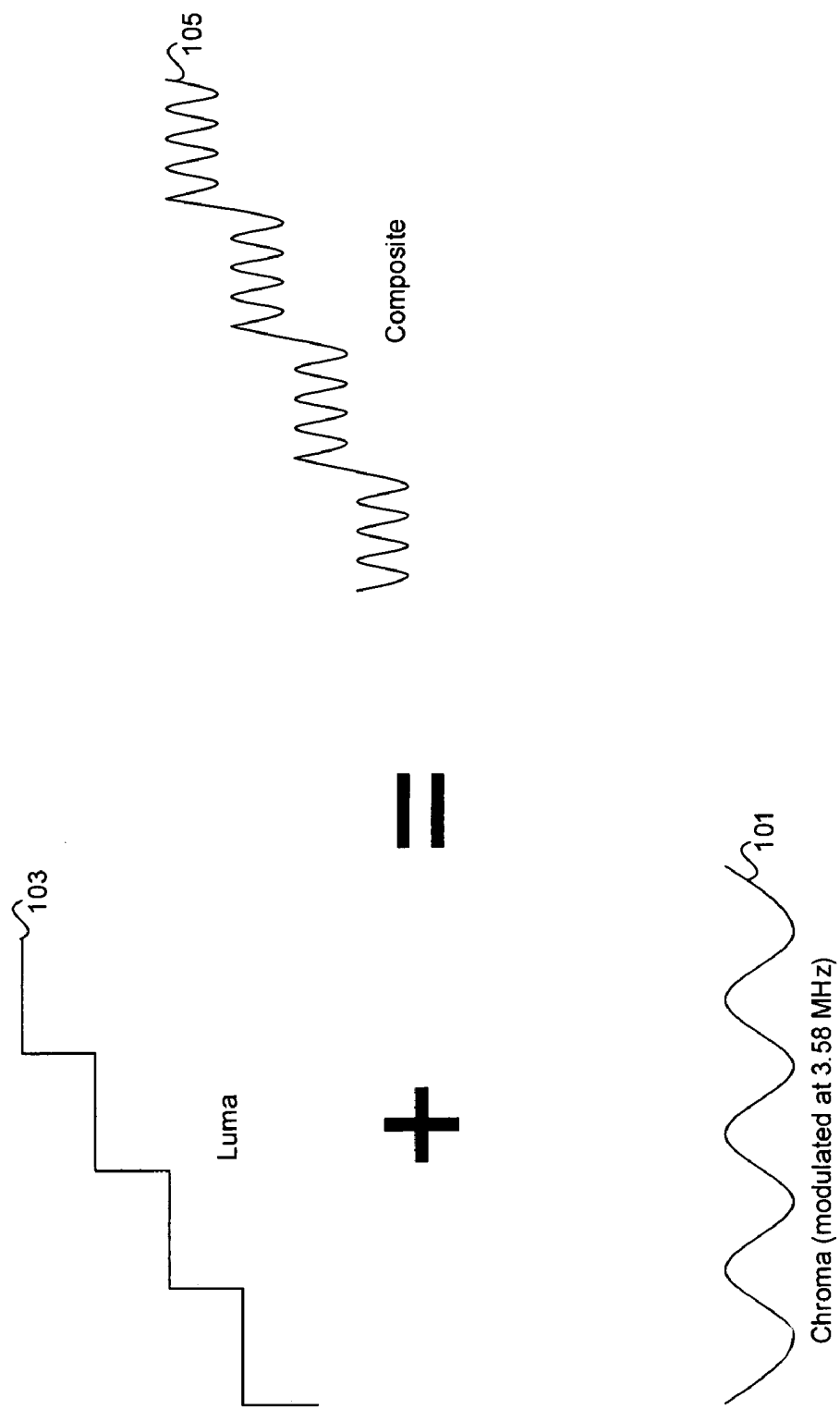
FIG. 1 is a diagram illustrating generation of a conventional composite video signal.
Figure 2A:
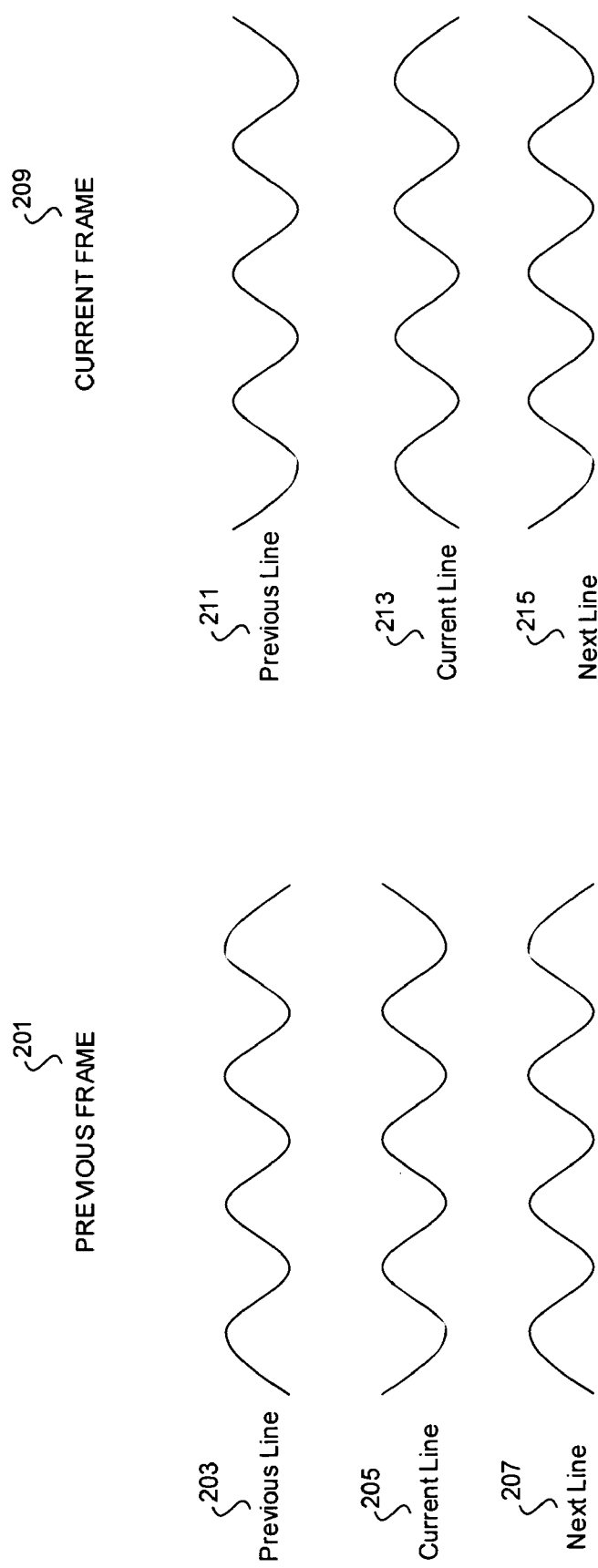
FIG. 2A is a diagram illustrating modulated chroma signals in contiguous composite video frames.
Figure 2B:
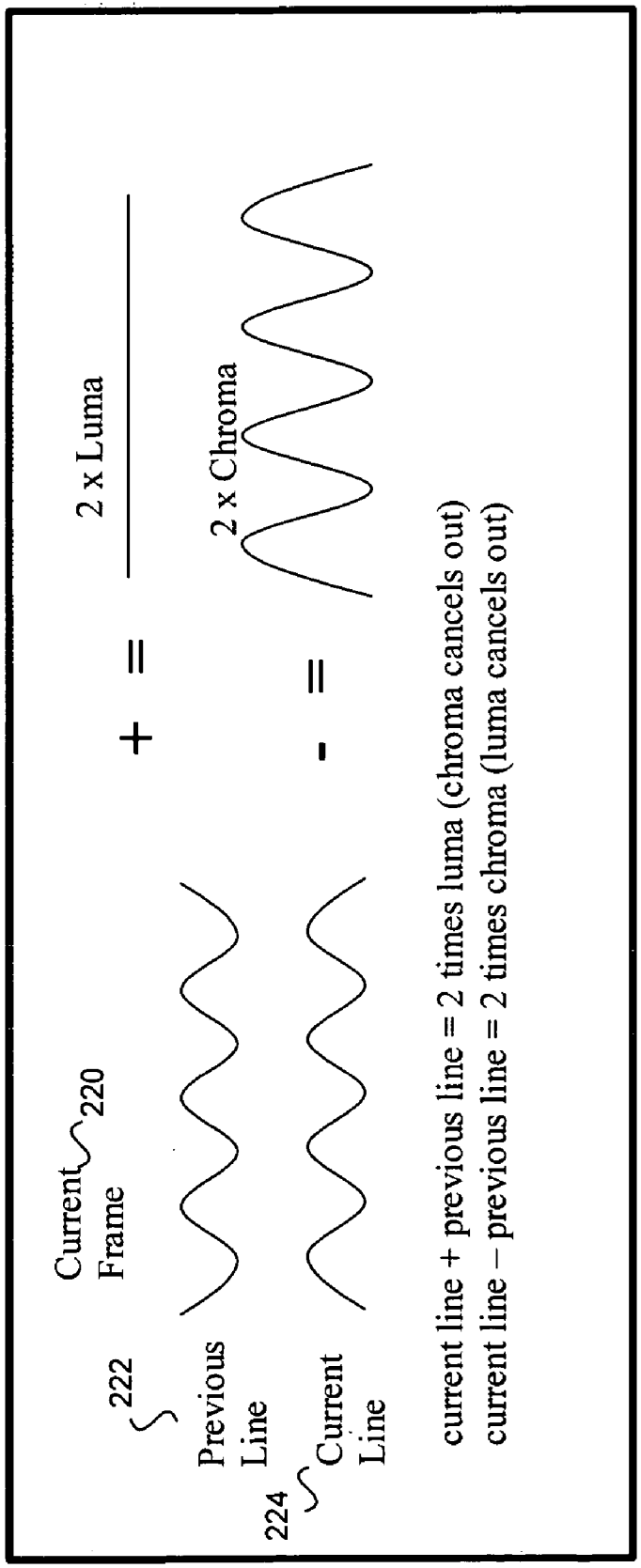
FIG. 2B is a diagram illustrating combing of a correlated current line and a previous line in a current frame.
Figure 2C:
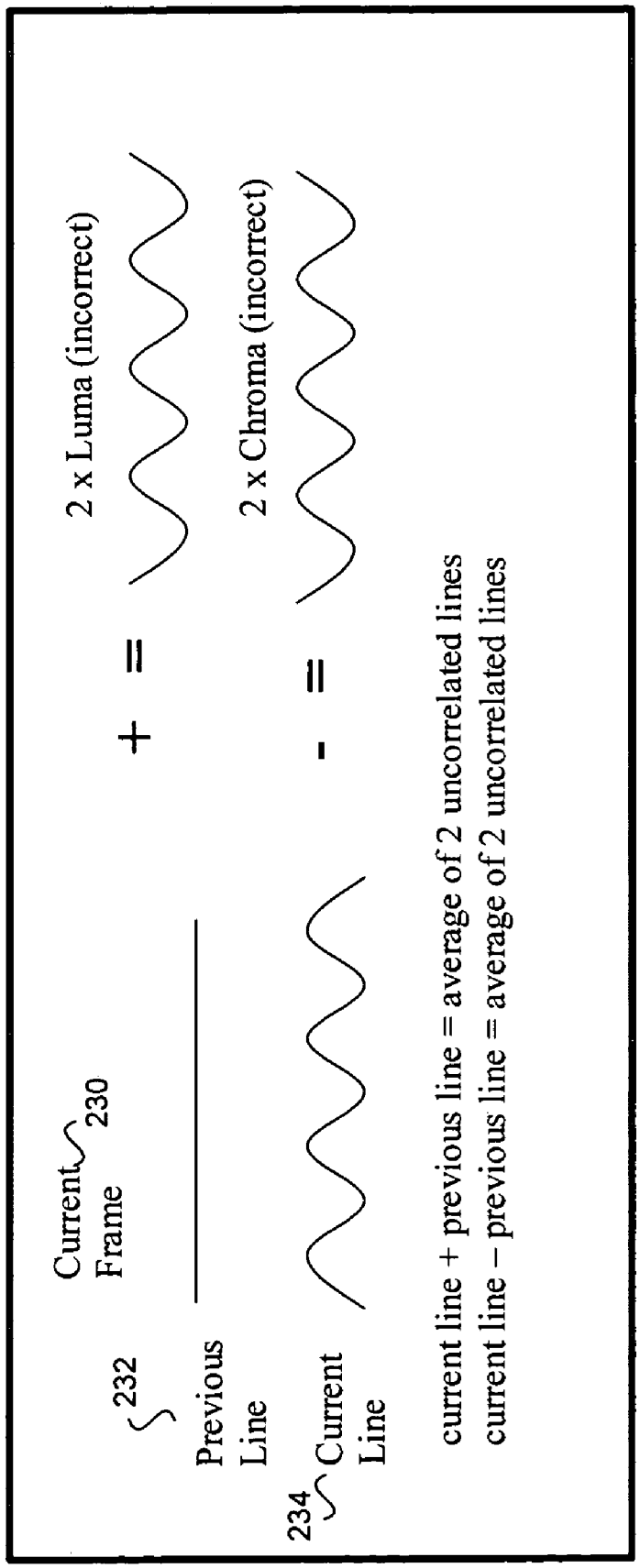
FIG. 2C is a diagram illustrating combing of a non-correlated current line and a previous line in a current frame.
Figure 3A:
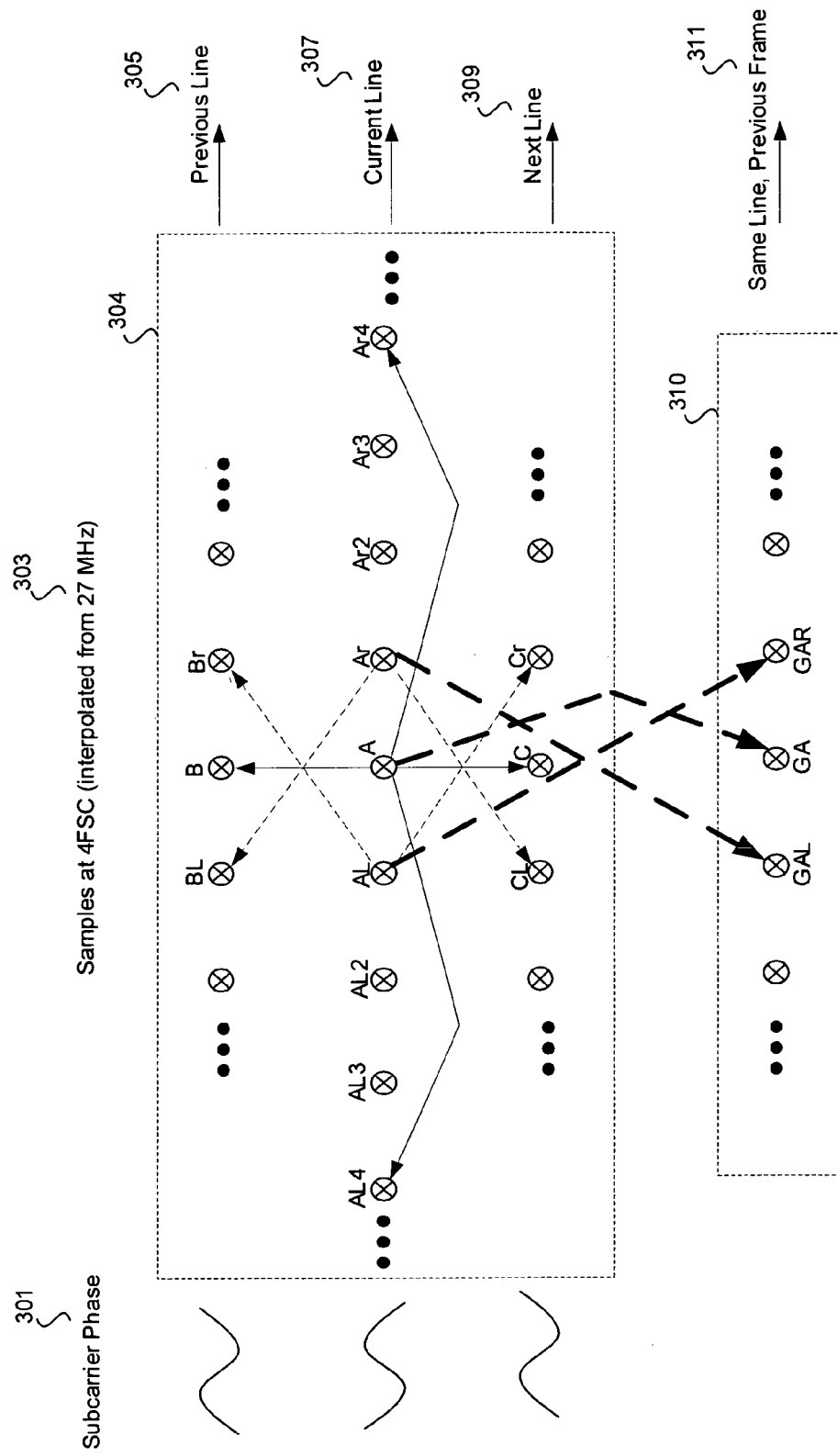
FIG. 3A is a diagram illustrating 2D and 3D comb filtering, in accordance with an embodiment of the invention.

FIG. 3A is a diagram illustrating 2D and 3D comb filtering, in accordance with an embodiment of the invention. Referring now to FIG. 3A, there is illustrated a sample of pixels from three adjacent lines in a current frame 304, a current line 307, a previous line 305, and a next line 309, as well as a same (current) line 311 but in a previous frame 310. The subcarrier phase 301 of the incoming composite video signal may be 3.58 MHz, and the incoming analog video signal may be digitized at 27 MHz, for example. Since 3.58 MHz and 27 MHz are not multiples of each other, there may not be an exact pixel sample every 3.58 MHz of digitized video signal that is aligned and in-phase. For example, it may be difficult to compare the peak of a sine wave on the current line 307 with the peak of a sine wave on the next line 309, since a pixel sample may not be obtained at the 27 MHz frequency. The composite video signal, therefore, may be run through a filter that interpolates pixel samples 303 at four times the frequency of the sub-carrier. For example, if the subcarrier frequency is at 3.58 MHz, the pixel samples 303 may be interpolated at 14.32 MHz.

Pixels A, B and C may be true sample pixels. However, all the remaining pixels to the left and to the right of the true sample pixels A, B and C, such as pixels BL, Br, AL, AL2, AL3, AL4, Ar, Ar2, Ar3, Ar4, CL, and Cr, may be interpolated pixels. In a given line, each pixel may be shifted by a quarter subcarrier cycle from the adjacent pixel. In addition, each line may be 180 degree phase-shifted from its adjacent line. For example, pixel A and interpolated pixel AL4, to the left of pixel A in the current line 307, may be in phase with each other, whereas pixel A and interpolated pixel AL may be quarter cycle phase-shifted from each other. Similarly, interpolated pixel Ar may be a quarter cycle phase-shifted to the right of pixel A, and interpolated pixel Ar4 may be in phase with pixel A. Since the current line 307 may be 180 degrees phase-shifted from either the previous line 305 or the next line 309, pixel A may also be phase-shifted 180 degrees from either pixel B in the previous line 305 or pixel C in the next line 309.

In an embodiment of the present invention, the amount of frequency content movement may be approximated between pixels within a given pixel line, between pixel lines within the same video frame, and between similar pixel lines in adjacent frames, and the corresponding combing method may be applied with a minimum bandwidth loss. For example, if vertical combing is applied with regard to pixel A, then pixel A may be subtracted from pixel B resulting in two times the luma, or pixel A may be subtracted from pixel C to obtain two times the luma, or pixel A may be subtracted from the average of B and C to obtain two times the luma. The same process may be performed between pixel A and interpolated pixel AL2, since they are out of phase The phase difference between pixels A and B is the same as between pixel A and interpolated pixel AL2, i.e. 180 degrees. In order to determine whether vertical combing may be applied without a significant bandwidth loss, pixels in the current line 307 and the previous line 305 may be compared. For example, interpolated pixel AL in the current line 307 may be compared with interpolated pixel Br in the previous line 305, where interpolated pixel AL is in phase with interpolated pixel Br since there is 360 degree phase difference between them. Similarly, interpolated pixel Ar may be compared with interpolated pixel BL, where interpolated pixel Ar is in phase with interpolated pixel BL since there is 360 degrees phase difference between them as well.

If these two comparisons indicate a big difference, this may be indicative of significant vertical frequency content going from B to A. If the difference between the interpolated pixels in the two comparisons is small, then this may indicate that there is not a lot of vertical frequency content. Accordingly, vertical combing may be applied between the current line 307 and the previous line 305 without a significant bandwidth loss. Similarly, comparisons between the interpolated pixels AL and Cr, and Ar and CL may be indicative of whether vertical combing may be applied between the current line 307 and the next line 309, without a significant bandwidth loss. Depending on the composite video signal, there may be no frequency content between pixel B and pixel A, which indicates that the current line and the previous line are identical lines. A large frequency content between pixel A and pixel C may indicate that a vertical transition has happened immediately after the current line. Conversely, there may be a lot of frequency content between pixel B and pixel A, and no frequency content between pixel A and pixel C. This may be characterized by the fact that the current line and the next line are very similar, but the current line and the previous line are different. In this case, vertical combing may be performed between the current line and the next line.

A final comparison may be performed between pixels A, B and C, in order to determine whether vertical combing may be applied with a minimum bandwidth loss. If pixels A, B and C are, for example, all in phase with each other, this may be indicative that there is no chroma component and pixels A, B and C contain only luma components, for example, if the video signal comprises a white character or a black background. In this case, since there is no frequency content between the current line 307, the previous line 305 and the next line 309, vertical combing may be applied without a significant loss in bandwidth.

With regard to horizontal combing, or notch filtering, pixel A may be compared with interpolated pixels AL4 and Ar4 in the current line 307, which are in phase with pixel A. This may provide an indication of the horizontal frequency content in the current line 307. If pixel A is very different from either of interpolated pixels AL4 or Ar4, it may indicate that there is significant frequency content in the current line 307. If, on the other hand, the pixels are very similar, it may indicate that there is less frequency content and horizontal combing may be applied. In an embodiment of the present invention, a wide band pass filter may be utilized in order to horizontally filter a composite signal and eliminate the luma component that is not near the chroma subcarrier frequency, for example, a 3.58 MHz subcarrier frequency.

In yet a different embodiment of the present invention, 3D combing may also be implemented taking into consideration temporal signal comparison for purposes of applying temporal combing with a minimum temporal bandwidth loss. Referring again to FIG. 3A, pixels in the same line/previous frame 311 may be considered. For example, GA may be an actual pixel similar to pixel A, but it may be phase-shifted 180 degrees from pixel A in the previous frame. Pixel GA may be the same pixel as pixel A in the previous frame, interpolated pixel GAL may be one quarter of a 3.58 MHz subcarrier frequency off to the left in the previous-frame, and interpolated pixel GAR may be one-quarter of a subcarrier cycle off to the right on the same line in the previous frame. Since pixels Ar and GAL are phase-shifted at 360 degrees and are in phase with each other, they may be compared for temporal frequency content.

Similarly, pixels AL and GAR may also be compared for temporal frequency content. If these two comparisons indicate that the pixels are similar, then this may indicate that pixel A is very similar to pixel GA and that there is no temporal frequency content movement from the previous frame. In this case, temporal combing may be performed since there will be no significant temporal bandwidth loss. If, on the other hand, the two comparisons show a large difference, then it may be indicative of a significant temporal frequency content between the current and the previous frame, and temporal combing, therefore, may not be desirable since it may involve temporal bandwidth loss. A comparison between pixel A and pixel GA may be useful in instance where there is a pixel that bears no color, for example, a black and/or a white pixel. Such pixels are characterized only by a luma component and, therefore, have no phase difference between each other. In this case, temporal combing may be applied without any resulting temporal bandwidth loss.

A 3D comb filter in accordance with an embodiment of the present invention, may be implemented by first horizontally combing a composite video signal. The horizontal combing may be accomplished by running the composite video signal through a very wide band pass filter, for example, so that it may pre-filter the very low frequency luma component within the composite video signal. In this way, if there is very coarse (VC), slow moving luma changes, such VC luma may be eliminated and not be considered in subsequent vertical and/or temporal combing processes. If a subcarrier frequency of 3.58 MHz is utilized, chroma components may be centered around 3.58 MHz, or approximately between 2 and 5 MHz. In other words, any frequency content below 2 MHz may be considered a luma component and may be filtered out by the band pass filter. By performing the corresponding comparisons between pixels, as outlined above, it may be determined whether vertical combing and/or temporal combing may be utilized without significant bandwidth loss. For example, horizontal and vertical combing, or 2D combing, may be the only useful combing methods in one embodiment of the present invention. In another embodiment of the present invention, horizontal, vertical and temporal combing, or 3D combing, may be applied without significant bandwidth loss. A final combing decision as to a specific composite signal may include a blend of 2D and 3D combing. In this case, a certain percentage of a pixel may be only vertically or horizontally combed, and the remaining percentage of the pixel may be combed vertically and temporally.

Figure 3B:
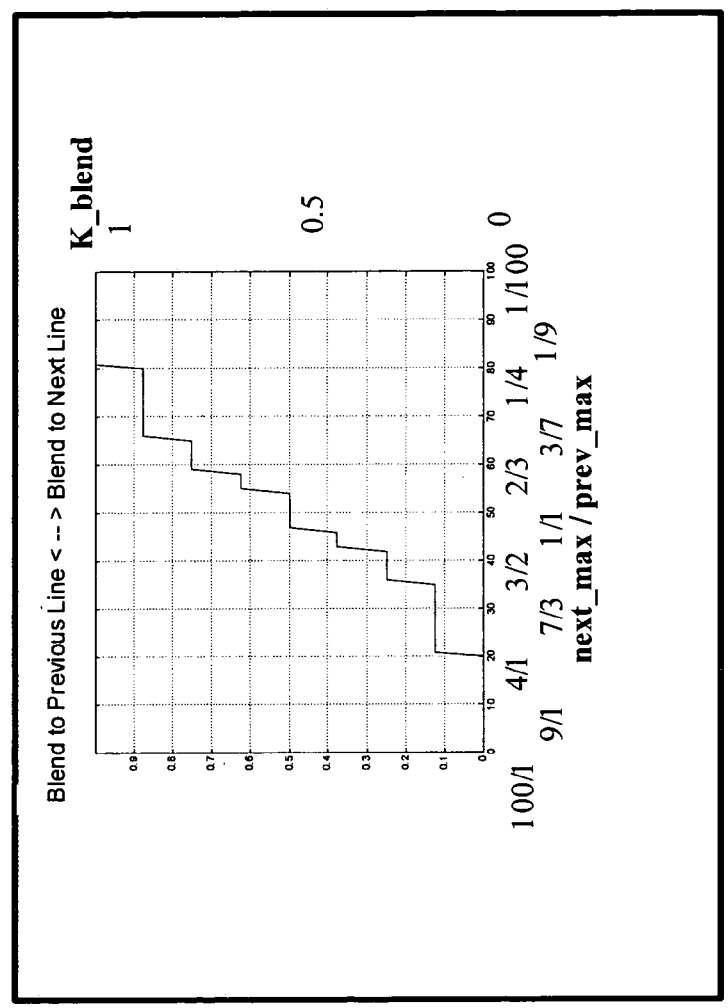
FIG. 3B is a diagram of a blending decision factor related to blending to previous line versus blending to next line, in accordance with an embodiment of the invention.

FIG. 3B is a diagram 330 of a blending decision factor related to blending to previous line versus blending to next line, in accordance with an embodiment of the invention. Referring to FIG. 3B, a decision as to the quality of combing with the previous line versus combing with the next line may be accomplished by calculating a ratio k_blend of the previous line compares to the next line compares, for example. The k_blend ratio may be calculated using compares and constant multiplies so that it is a value between zero and one. This is a non-linear ratio between the comparison to the previous line and the comparison to the next line. A constant value in the k_blend calculation may be utilized to bias strongly against luma only comparisons. In the case of low chroma it may not be desirable to falsely pass the luma only condition. K_blend may be calculated as a function of next_max and prev_max. Next_max may be a measure of the bandwidth difference between a current line and a next line, for example. Prev_max may be a measure of the bandwidth difference between a current line and a previous line, for example. K_blend may be a function of the ratio of prev_max to next_max. The larger the ratio, the smaller the value of k_blend. The previous and next lines may be alpha blended together to comb with the current line. Conceptually the blend tends toward the smaller of prev and next. The blend will skew toward next_line when next_max/prev_max is small, and skew toward prev_line when prev_max/next_max is small.

In one-aspect of the invention, a different blending decision factor may be determined. A notch filter may be utilized for horizontal combing. In order to obtain a better combing decision, a notch filter may be compared to a vertical comb filter by calculating a ratio of the quality of the vertical comb using the previous line, to the quality of the horizontal comb. A different ratio my be related to the quality of the vertical comb using the next line, to the quality of the horizontal comb.

Figure 3C:
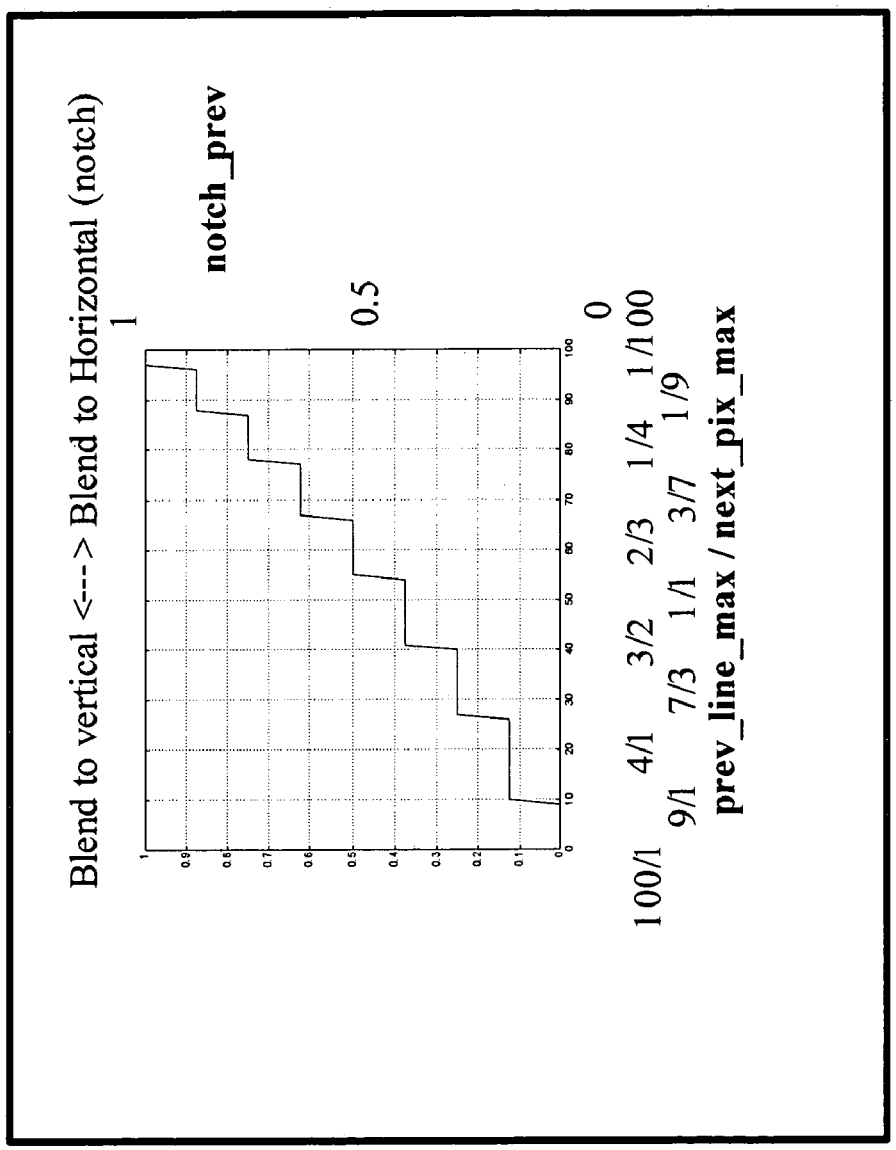
FIG. 3C is a diagram of a blending decision factor related to blending vertically versus blending horizontally, in accordance with an embodiment of the invention.

FIG. 3C is a diagram 340 of a blending decision factor related to blending vertically versus blending horizontally, in accordance with an embodiment of the invention. Referring now to FIG. 3C, a blending decision factor may be determined from a ratio notch_prev, where notch_prev may indicate whether to blend vertically and/or horizontally between a current line and a previous line. Notch_prev may be determined as a function of prev_line_max and next_pix_max. Prev_line_max may be a measure of the bandwidth difference between a current line and a previous line. Next_pix_max may be a measure of the bandwidth difference between two sets of in-phase pixels in a current line. A higher notch_prev ratio may indicate a preference towards notching versus vertical blending.

A notch_next ratio may be determined in a similar way, where notch_next may indicate whether to blend vertically and/or horizontally between a current line and a next line. A final notch ratio may be determined as a function of the notch_prev and notch_next ratios in order to obtain a blending decision factor related to blending vertically versus blending horizontally. For example, a final notch value for each pixel may be determined by the following equation:

$$\text{notch} = \text{notch\_next}.*k\_blend + \text{notch\_prev}.*(1 - k\_blend)$$

Conceptually, if the k_blend combing decision tends towards combing with the top line, the top line may be given more weight in judging the relative goodness of notching. If the k_blend combing decision tends towards combing with the bottom line, the bottom line may be given more weight in judging the relative goodness of notching.

In cases of significantly more luma than chroma at a given point in a composite signal, a notch filter may be gradually disabled. This is because the notch filter tends to put most of the signal that is left, after an initial high pass filter, into chroma. If the combed signal is mostly luma, it may be inefficient to allow it to be put into chroma.

Figure 3D:
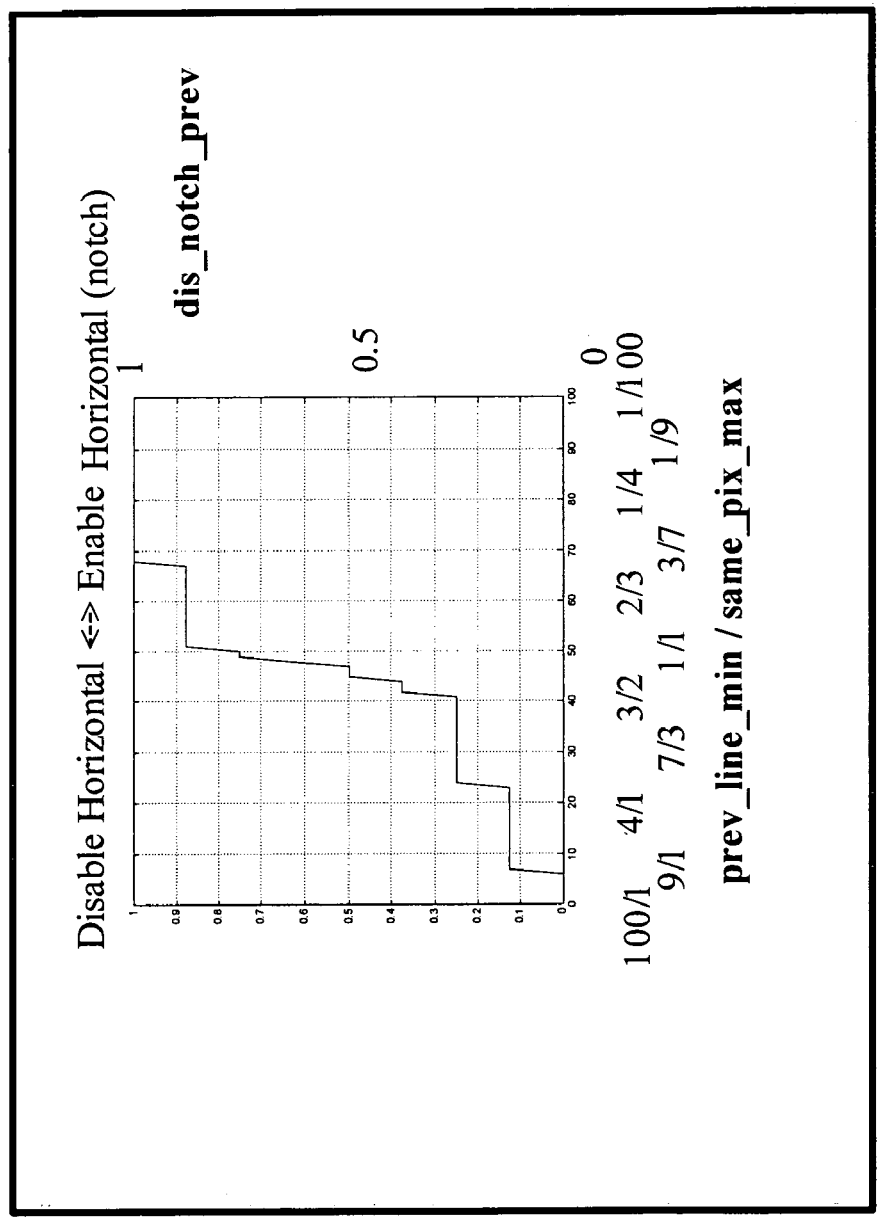
FIG. 3D is a diagram of a blending decision factor related to enabling horizontal combing versus disabling horizontal combing, in accordance with an embodiment of the invention.

FIG. 3D is a diagram 350 of a blending decision factor related to enabling horizontal combing versus disabling horizontal combing, in accordance with an embodiment of the invention. Referring to FIG. 3D, a disable notch signal dis_notch_prev may be generated by a ratio of the previous/next line compare with the previous/next line luma only compare. If the point is mostly luma, the luma only compare will be much smaller than the in phase compare. Dis_notch_prev may be determined as a ratio between prev_line_min and same_pix_max, for example. Prev_line_min may be associated with a bandwidth difference between in-phase pixels in a current and previous lines. Same_pix_max may be associated with a bandwidth difference between out-of-phase pixels in a current, previous and next line.

Similarly, a dis_notch_next may be determined as a ratio between next_line_min and same_pix_max, for example, where next_line_min may be associated with a bandwidth difference between in-phase pixels in a current and next lines. Dis_notch_next and dis_notch_prev, therefore, may be determined by the ratio of the previous or next line luma and chroma compare to the previous or next line luma only compare.

If the amplitude of the band passed video signal is very small relative to the difference to the closest matching adjacent line, then the disable notch parameter is not an accurate measure. In this case, the disable notch may not be used. A disable vertical notch, dis_vert_notch, parameter may be utilized.

Figure 3E:
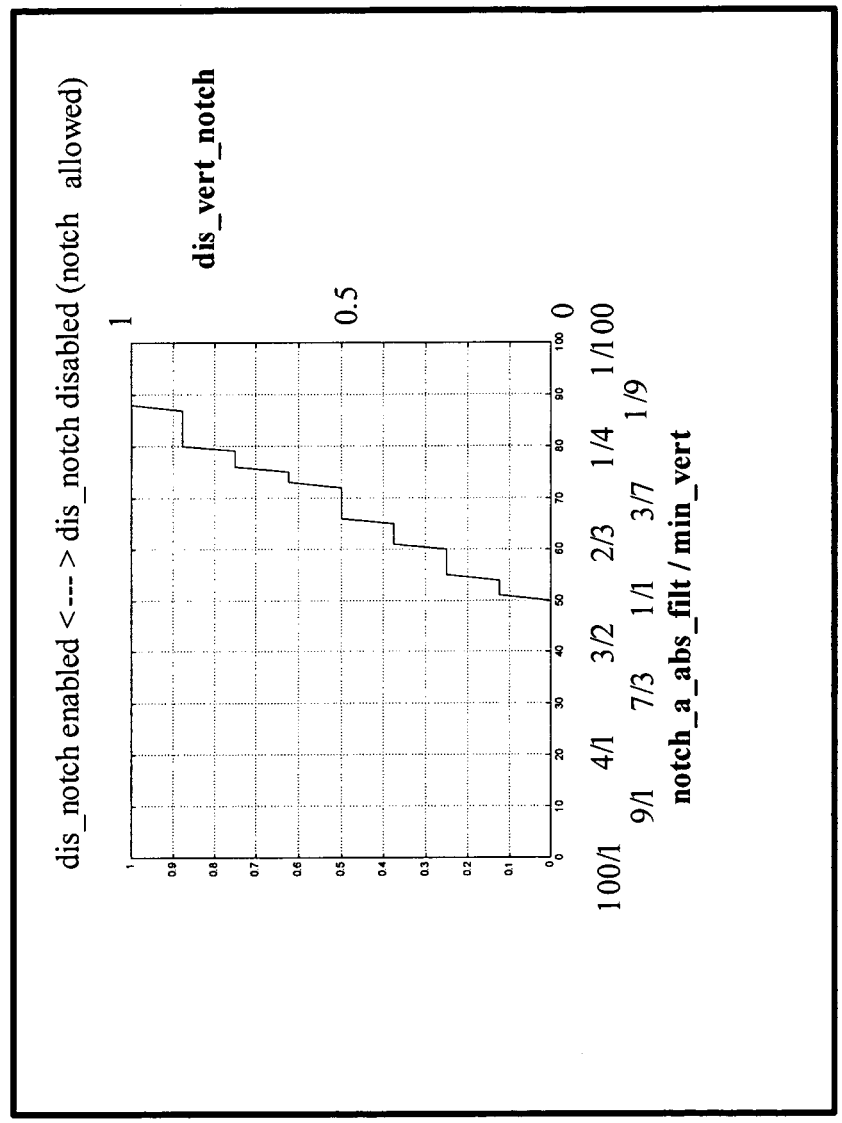
FIG. 3E is a diagram of a blending decision factor related to horizontal combing, in accordance with an embodiment of the invention.

FIG. 3E is a diagram 360 of a blending decision factor related to horizontal combing, in accordance with an embodiment of the invention. Referring now to FIG. 3E, a dis_vert_notch may be calculated as a ratio of notch_a_abs_filt and min_vert, for example. Notch_a_abs_filt may measure the absolute value of an amplitude of a signal on a current line. Min_vert may be associated with the minimum of bandwidth difference between current line and a previous line, and/or a current line and a next line.

Conceptually, if dis_vert_notch is zero, then it has no effect. Dis_notch is allowed to mask or not mask notch. If dis_vert_notch is one, then dis_notch has no effect and dis_notch may be disabled. In this case notch is never masked, and the decision to notch or vertically comb is utilized without modification. A weighted disable notch ratio dis_notch may be calculated as:

$$\text{dis\_notch} = \max(\text{dis\_notch}, \text{dis\_vert\_notch})$$

The calculated notch signal may be cubed and disable notch may be squared. This may cause the roll off due to notch to be accelerated. Then disable notch may be used to calculate a final value for notching. Notch may also be low pass filtered and may be generated according to the following equation:

$$\text{notch} = \text{dis\_notch}^2 * \text{notch}^3$$

Referring again to FIG. 3A, since points A and GA are 180 degrees out of phase with each other, in chroma, they may not be directly compared, except in the case where there is no chroma at this point. Points A, B, C and G are actual sampled points sampled at 27 MHz. All the other points may be interpolated to give 4FSC sample points. Points AL and AR may be one quarter of a subcarrier cycle away from point A. Points GAL and GAR may be one quarter of a subcarrier cycle away from point GA. Since points A and GA may be 180 degrees out of phase with each other, AL may be in phase with GAR and AR may be in phase with GAL. Since they are in phase they can be directly compared. There may be some spatial difference between these points and points A and GA. But, by shifting the samples a quarter of a cycle in each direction, the spatial difference may be minimized a measure of the temporal bandwidth (motion). In order to calculate a measure of temporal bandwidth, in the case where there is no chroma at this point, points G may be compared directly with point A. The actual measure of the temporal bandwidth may be calculated by comparing the temporal bandwidth in the case With chroma and the case of luma only. The results may be low pass filtered.

An estimate may be obtained of the quality of the 2D comb. This may be calculated based on the difference between the current pixel and the pixel that the 2D combing logic decided to comb with. First the vertical difference may be calculated according to the ratio of k_blend. Next this may be blended with the horizontal quality according to the ratio of notch. The qualities of the vertical blends, previous and next, may be weighted together to give an overall vertical quality measure. This vertical quality measure may then be weighted together with the horizontal quality, giving an overall quality measure of the 2D comb.

Figure 4A:
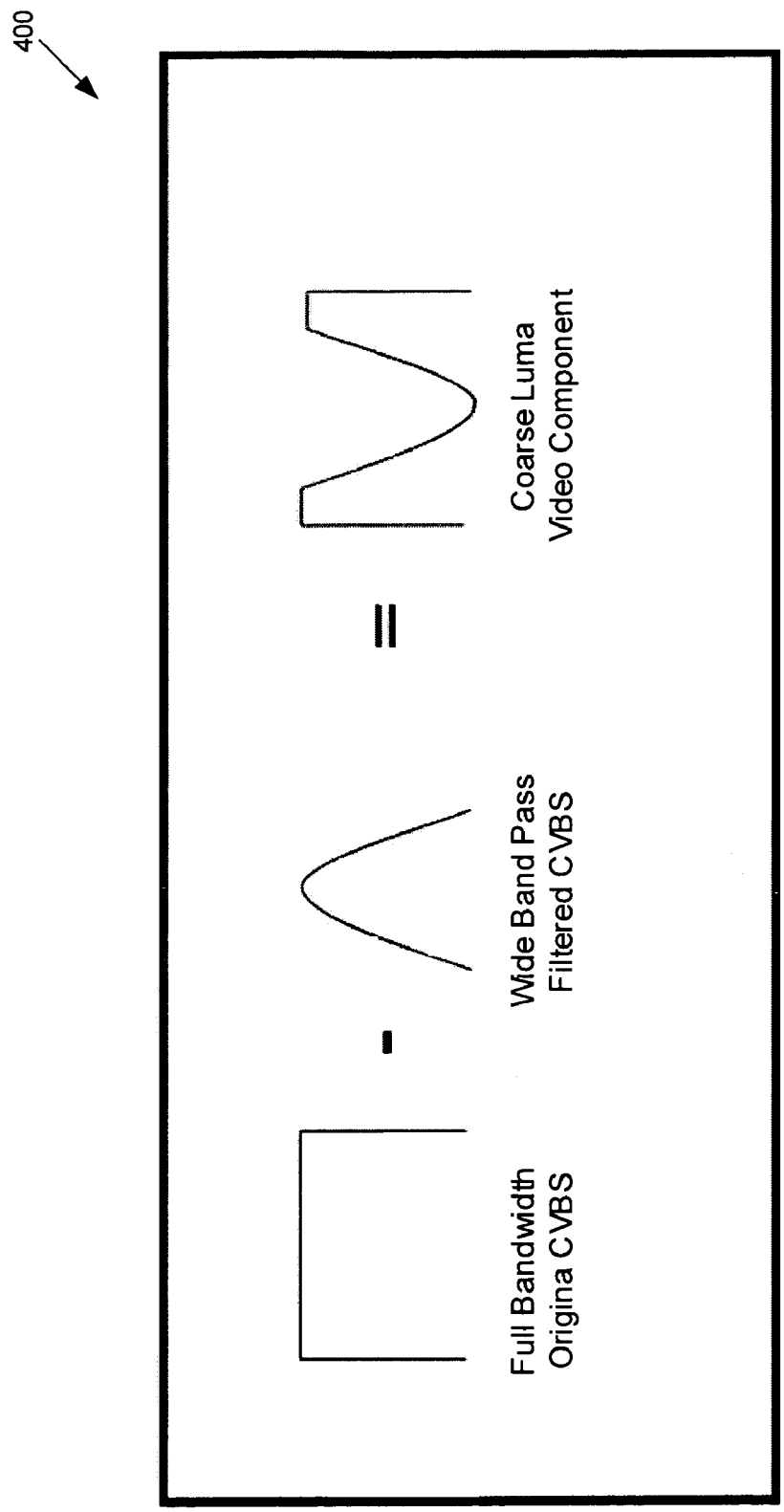
FIG. 4A is a diagram of coarse luma determination, in accordance with an embodiment of the invention.

FIG. 4A is a diagram 400 of coarse luma determination, in accordance with an embodiment of the invention. A coarse estimate of luma may be obtained for both the current frame and the previous frame as illustrated in FIG. 4A. This may be accomplished by subtracting the band passed signal from the composite signal. In this way, the part of luma that is clearly outside the chroma bandwidth range may be obtained. The coarse estimate of luma may be used to mask off the 3D combing decision. If the luma part of the composite signal does not match between the two frames, it may be determined that there is motion. This may be true even if the band passed part of the signal matches perfectly.

Figure 4B:
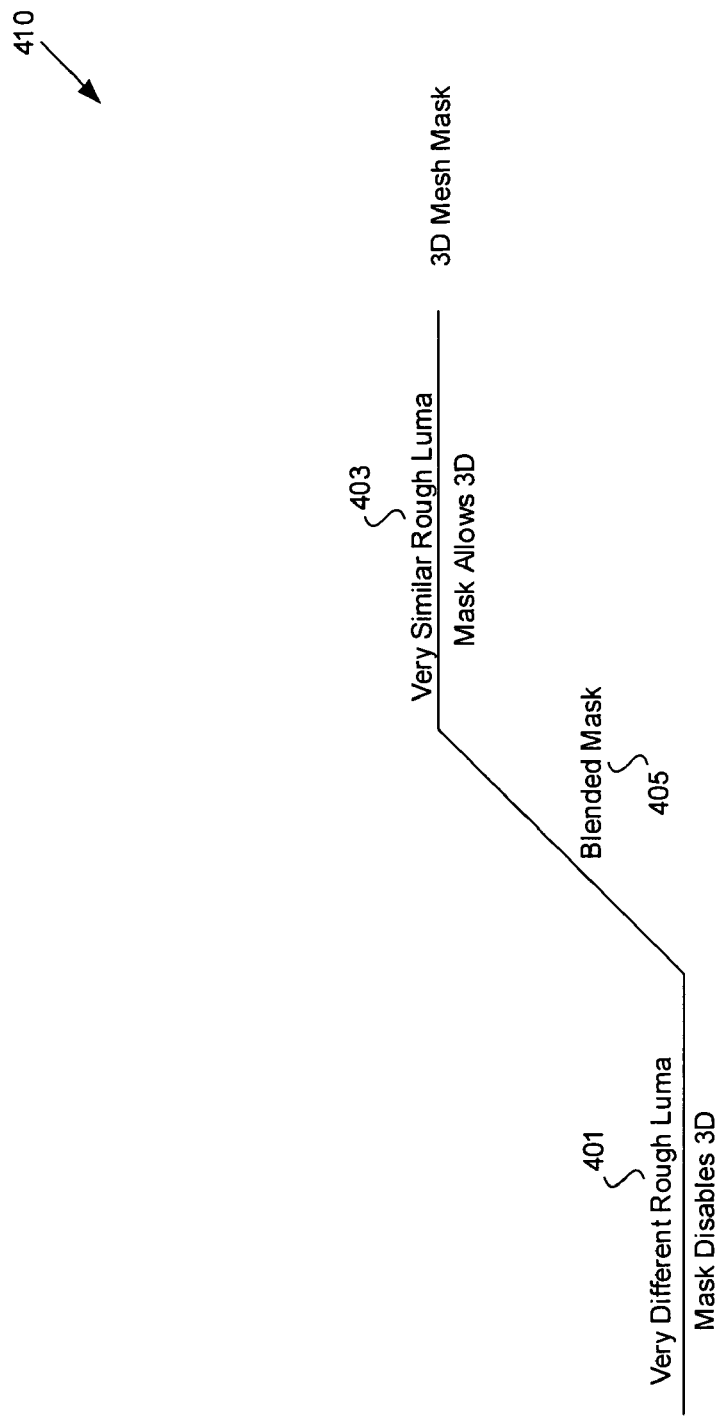
FIG. 4B is a diagram of a 3D comb filter mesh mask, in accordance with an embodiment of the invention.

FIG. 4B is a diagram 410 of a 3D comb filter mesh mask, in accordance with an embodiment of the invention. A mesh mask may be utilized in order to ascertain whether 3D combing may be utilized for a specific composite signal. Referring now to FIGS. 4A and 4B, the output of a wide band pass filter may be subtracted from an original composite signal input, and a low frequency luma component may be obtained, or a rough estimate of the low frequency luma. Such estimate of low frequency luma may be calculated for a current frame and for a previous frame, for example. The two resulting rough values of luma may then be compared on a pixel-by-pixel basis. If the two rough luma values are very different, then 3D combing may be disabled by the mask, at 401, and 2D combing be the only method that may be applied to separate luma and chroma components in the composite video signal. If the two rough luma values are very similar, then 3D combing may be allowed by the mesh mask, at 403, and the composite video signal may be combed horizontally, vertically and temporally. For any value of the luma difference, which is between 401 and 403, a blended mask 405 may be applied to separate the luma and chroma components of the composite video signal.

In another embodiment of the present invention, the blended mask 405 may be applied in cases where the two rough luma values are not very different. A blended mask may indicate, for example, that a certain percentage of the 3D combing, for example 30%, may be "trusted" and the remaining percent, for example the remaining 70%, may be combed via 2D combing. The blended mask may re-adjust the ratio between 3D combing and 2D combing for a given pixel depending on how close the two rough luma values are to being very different and how close they are to being very similar.

Figure 4C:
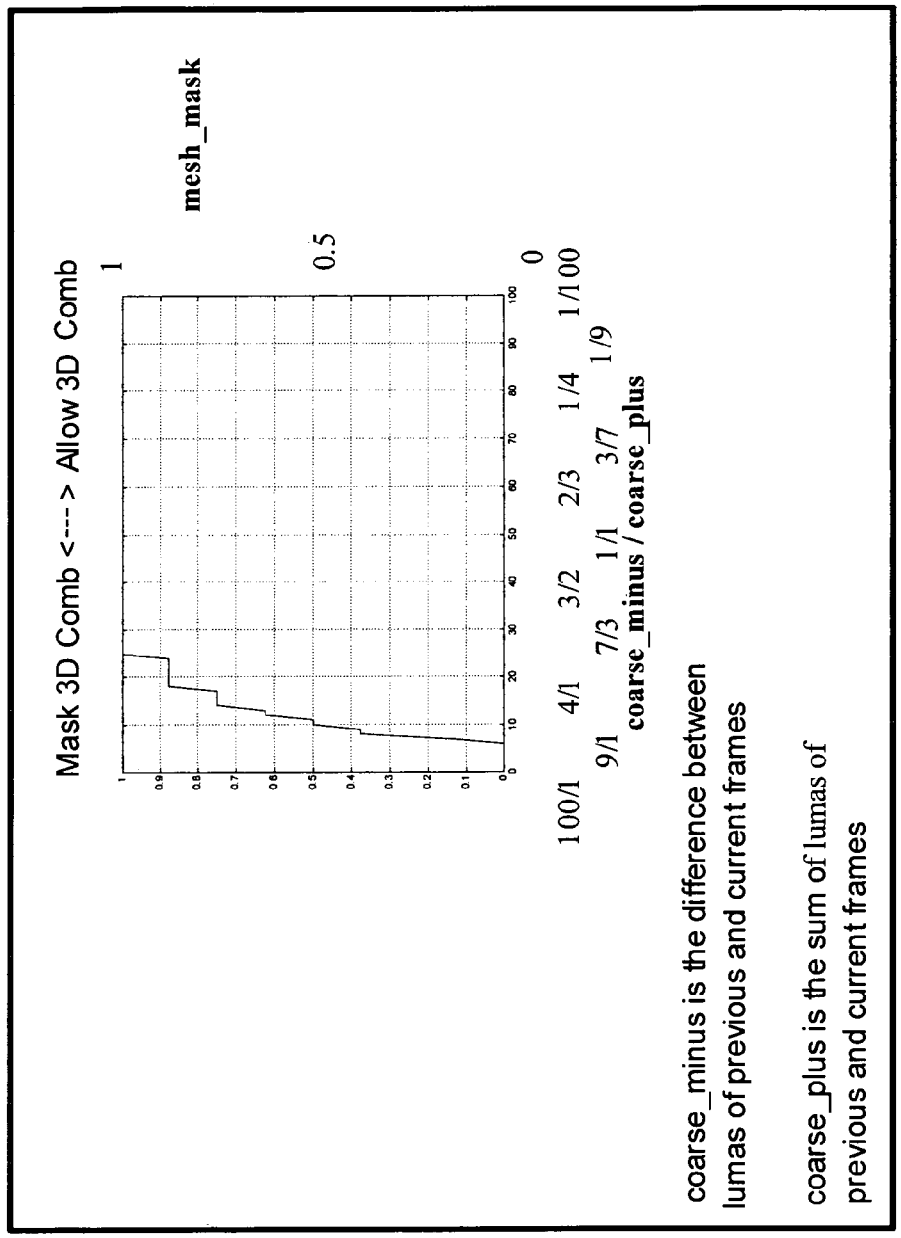
FIG. 4C is a diagram of a 3D comb filter mesh mask, in accordance with an embodiment of the invention.

FIG. 4C is a diagram 420 of a 3D comb filter mesh mask, in accordance with an embodiment of the invention. Mesh_mask may be determined as a ratio between coarse_minus and coarse_plus, for example. Coarse_minus may be the difference between lumas of previous and current frames. Coarse_plus may be the sum of lumas of previous and current frames. Mesh_mask ratio may tend towards masking 3D combing if the luma between the two consecutive frames is very different. It may also tend towards allowing 3D combing if the luma between the two consecutive frames is very similar.

Figure 4D:
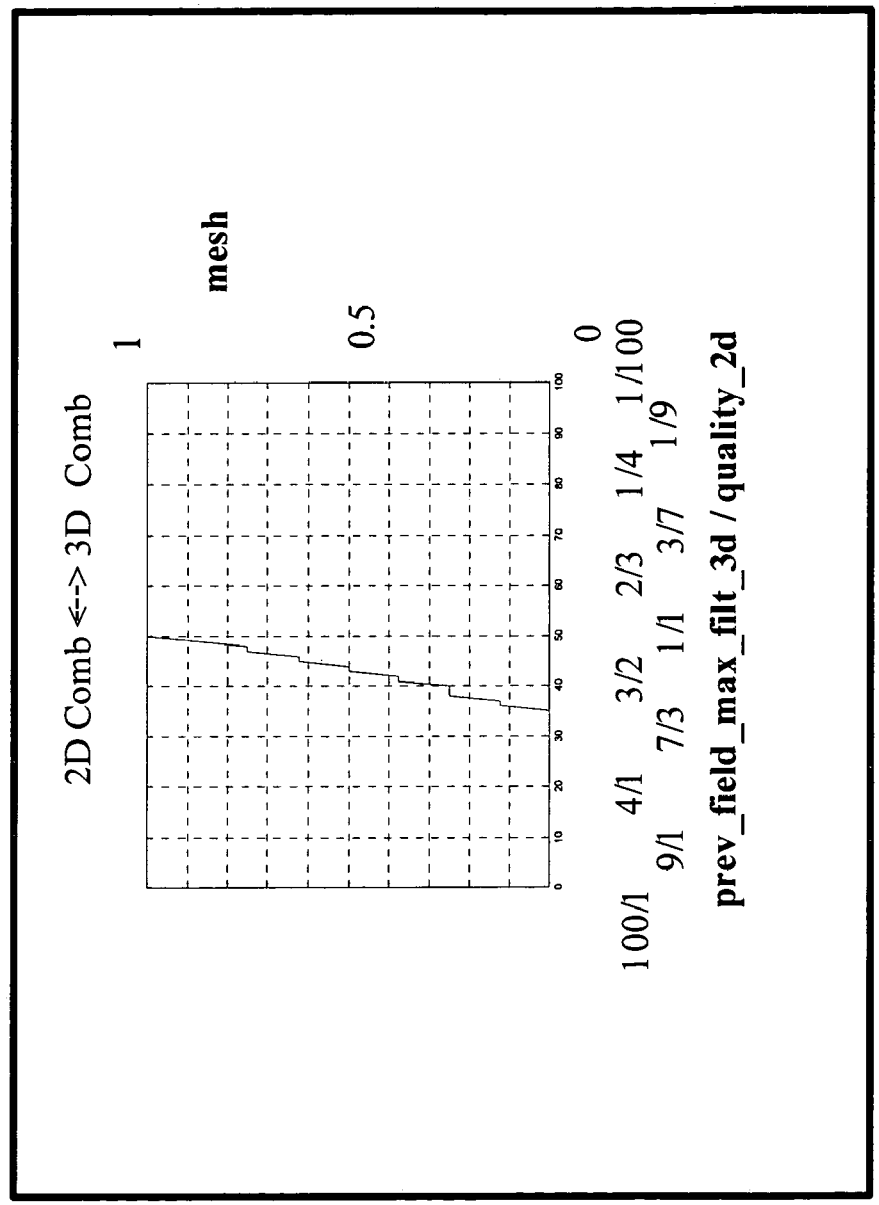
FIG. 4D is a diagram of a 3D comb filter mesh, in accordance with an embodiment of the invention.

FIG. 4D is a diagram 430 of a 3D comb filter mesh, in accordance with an embodiment of the invention. Referring to FIG. 4D, a mesh ratio may be determined as a measure of combing quality of 2D combing versus 3D combing. Mesh may be determined as a ratio between prev_field_max_filt_3d and quality_2d. Prev_field_max_filt_3d may be a measure of bandwidth difference between a pixel in a current frame and the same pixel in a previous frame. Quality_2d may be a measure of quality of 2D combing, as measured, for example, by various ratios as specified above in this application.

To determine the blending of 3D combing versus 2D combing the quality of the 2D comb decision is compared with the quality of 3D combing. The ratio of these two numbers determines the blend between 2D and 3D combing. Conceptually, mesh may tend towards the smaller of quality_2d (error term of 2D comb) and prev_field_max_filt_3d (error term of, 3D comb). The larger prev_field_max_filt_3d is (or the worse the quality of the 3D comb), the more mesh may tend to 2D comb. The larger quality_2d (or the worse the quality of the 2D comb), the more mesh may tend to 3D comb.

A final blend of 3D combing and 2D combing may be based on the product of the mesh and the mesh mask. The following equation may be utilized:

mesh=mesh*mesh_mask

The final mesh value may be used to alpha blend the chroma and luma between 2D and 3D combing.

In yet a different embodiment of the present invention, a time constant may be utilized to attenuate, or affirm, a 3D comb filter mesh value for a current frame based on 3D comb filter mesh values of preceding frames. For example, if the 3D comb filter mesh values of the preceding frames allow for 3D combing, then the time constant may be utilized to affirm the current 3D comb filter mesh value and allow for 3D combing in the current frame. Similarly, if the 3D comb filter mesh value of the preceding frames indicate that 2D combing, rather than 3D combing, may be utilized for minimum bandwidth loss, then the time constant may be utilized to attenuate the 3D comb filter mesh value thus indicating a higher likelihood for 2D combing in the current frame. A 3D mesh value may be generated by a unidirectional or bidirectional 3D comb filter, for example.

Figure 5:
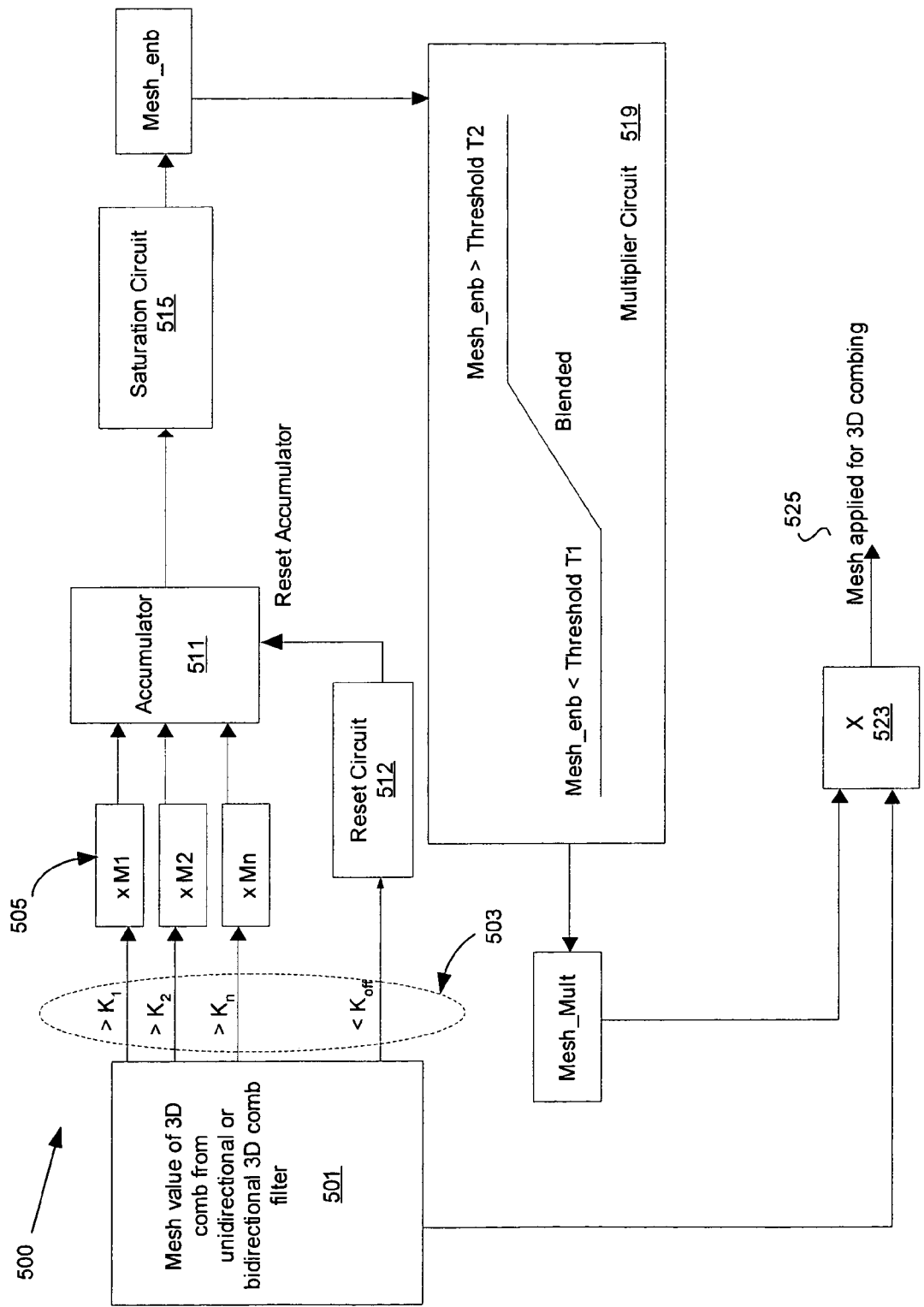
FIG. 5 is a block diagram of a time constant calculation circuit, in accordance with an embodiment of the invention.

FIG. 5 is a block diagram of a time constant calculation circuit, in accordance with an embodiment of the invention. The time constant calculation circuit 500 may comprise a mesh input block 501, an accumulator 511, a saturation circuit 515, a reset circuit 512, a multiplier circuit 519, and a multiplier 523.

In operation, the mesh input block 501 may be adapted to provide a 3D comb filter mesh value received from a unidirectional or a bidirectional 3D comb filter, for example. Each received 3D mesh value may be compared to threshold values 503. For example, threshold values $K_1$, $K_2$, and $K_n$ may be utilized. The threshold values $K_1$, $K_2$, and $K_n$ may be associated with multipliers 505, $M_1$, $M_2$, and $M_n$, respectively, so that if a threshold value is satisfied, the corresponding threshold multiplier may be applied to the mesh value. After a multiplier is applied to a mesh value, the result may be stored in the accumulator 511. The threshold value $K_{off}$ may be associated with an accumulator reset function. If a 3D comb mesh value generated by the mesh input block 501 is smaller than the threshold $K_{off}$, the accumulator 511 may be reset by the reset circuit 512.

The saturation circuit 515 may be adapted to accumulate the received mesh values for each frame and saturate at a predetermined value S. For example, five subsequent 3D comb mesh values may indicate 3D combing and may saturate the saturation circuit 515. After a weighted mesh value is stored in the accumulator 511, a mesh enable value (mesh_enb) may be communicated to the mesh multiplier estimation block 519. Mesh_enb may be equal to the weighted mesh value stored in the accumulator 511.

The multiplier circuit 519 may be adapted to calculate a mesh multiplier value based on the mesh enable value, where the mesh multiplier value may be between zero and one. For example, the multiplier circuit 519 may determine whether the mesh enable value is a value between a lower threshold T1 and a higher threshold T2. The values of lower threshold T1 and a higher threshold T2 may be determined for different embodiments of the present invention and may be programmable. If mesh_enb is at most the threshold T1, then the multiplier circuit 519 may return a zero value for the mesh multiplier value. Similarly, if mesh_enb is higher than the threshold T2, then the multiplier circuit 519 may return a value of one for the mesh multiplier value. If mesh_enb is between the threshold T1 and T2, then the multiplier circuit 519 may blend the mesh multiplier and may return a value between zero and one for the mesh multiplier value. The mesh multiplier value may then be communicated to the multiplier 523, where the current 3D mesh value received from the mesh input block 501 and the mesh multiplier value are multiplied. The mesh multiplier value, therefore, may be utilized as a 3D comb filter time constant as it attenuates, or affirms, a 3D comb filter mask for a current frame based on 3D comb filter mask values of preceding frames. In this way, if the mesh multiplier is zero, final 3D comb mesh value 525 will be zero and as a result 3D combing will be disabled. If the mesh multiplier is one, final 3D comb mesh value 525 will be equal to the initial 3D comb mesh value received from the mesh input block 501. In this way, 3D combing will be performed in accordance with the original 3D comb mesh value.

In another aspect of the invention, a mesh multiplier value, or a time constant value, may be determined by utilizing the following exemplary code:

The equation add_to_enb=(mesh>$K_1$)*$M_1$+(mesh>$K_2$)*$M_2$+(mesh>$K_n$)*$M_n$ represents the assigning of weight to a 3D comb mesh value by utilizing the multipliers 505, $M_1$, $M_2$, and $M_n$, if the 3D comb mesh value is greater than the threshold values $K_1$, $K_2$, and $K_n$, respectively.

The equation mesh_enb=(mesh_enb+add_to_enb)*(mesh>$K_{off}$) represents the accumulation of the weighted 3D comb mesh values and resetting of the accumulation if the 3D comb mesh value is smaller than the threshold value $K_{off}$.

The equation mesh_enb=min(mesh_enb, 16) represents the saturation of mesh_enb that may be utilized in a saturation block, for example. A saturation value of S=16 is utilized in this example, but the invention is not limited in this way. In another aspect of the invention, other saturation values may be utilized.

The equation mesh_mult=max(0, mesh_enb−8)/8 represents blending of a mesh multiplier, that may be utilized in a multiplier circuit, for example. Subtraction and dividing by a factor of 8 may be utilized to achieve the blending. The factor 8 is selected to correspond to the saturation value S=16, but the invention is not limited in this way. In another aspect of the invention, other subtraction and divide factors that correspond to the saturation value may be selected.

The equation mesh=mesh*mesh_mult represents the final blending of the 3D comb mesh value utilizing the blended mesh multiplier value.

Figure 6:
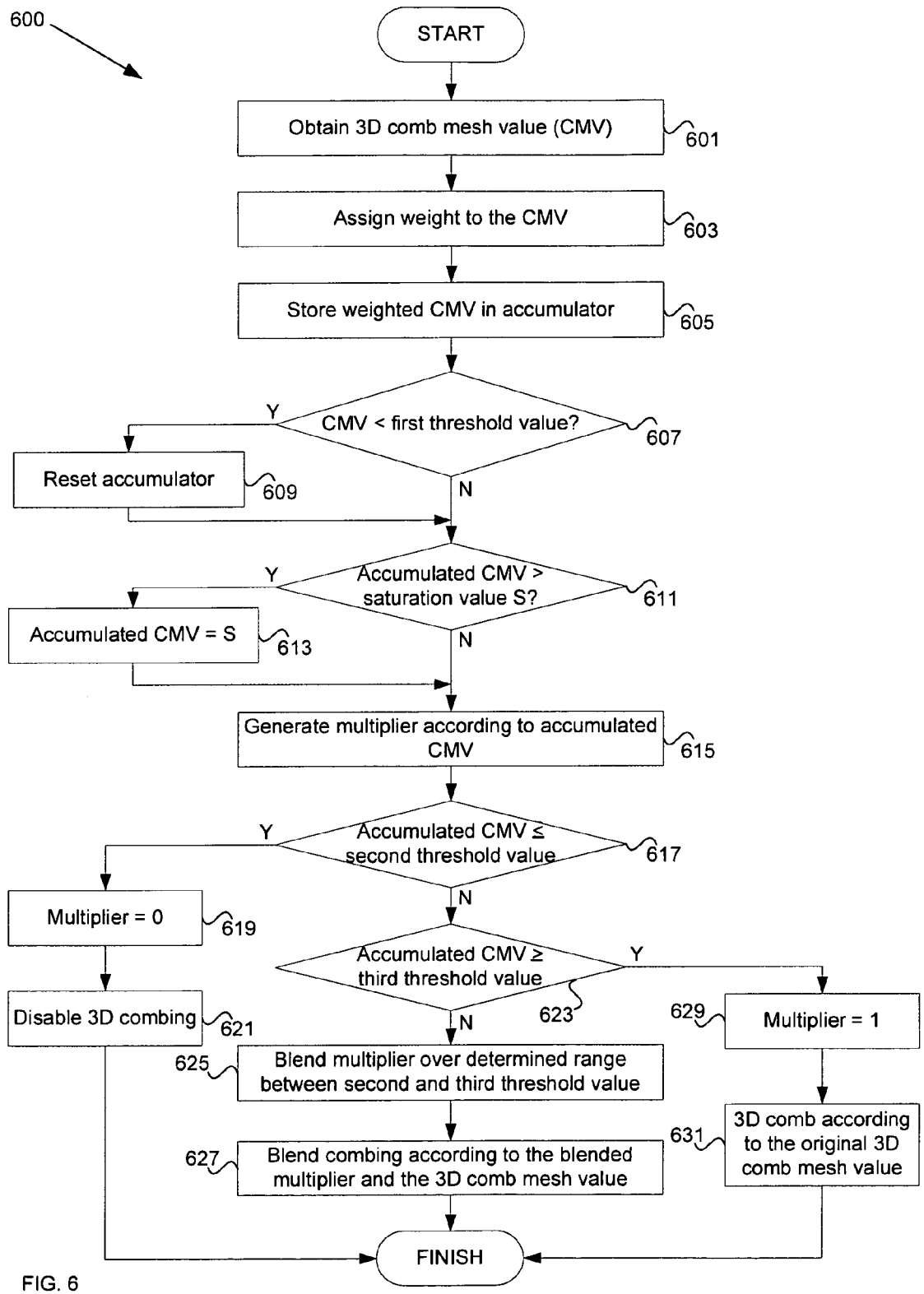
FIG. 6 is a flow diagram of an exemplary method for 3D comb filter time constant determination, in accordance with an embodiment of the invention.

FIG. 6 is a flow diagram of an exemplary method 600 for 3D comb filter time constant determination, in accordance with an embodiment of the present invention. At 601, a 3D comb mesh value (CMV) may be obtained. At 603, weight may be assigned to the CMV. For example, a plurality of multipliers may be utilized depending on the value of the CMV. At 605, the weighted CMV may be stored in an accumulator. At 607 it may be determined whether the CMV is smaller than a first threshold value. If the CMV is smaller than a first threshold value, the accumulator storing the weighted CMV may be reset at 609. At 611 it may be determined whether the accumulated CMV is greater than a saturation value S. If the CMV is greater than the saturation value S, then, at 613, the accumulated CMV may be set to the saturation value S. At 615, a multiplier may be generated according to the accumulated CMV.

At 617, it may be determined whether the accumulated CMV is at most equal to a second threshold value. If the accumulated CMV is at most equal to the second threshold value, at 619, the multiplier may be set to zero and 3D combing may be disabled, at 621. At 623, it may be determined whether the accumulated CMV is at least equal to a third threshold value. If the accumulated CMV is at least equal to the third threshold value, at 629, the multiplier may be set to one and 3D combing may be performed according to the original 3D comb mesh value, at 631. At 625, the multiplier may be blended over a determined range between the second and third threshold values. At 627, combing may be blended according to the blended multiplier and the 3D comb mesh value.

Figure 7:
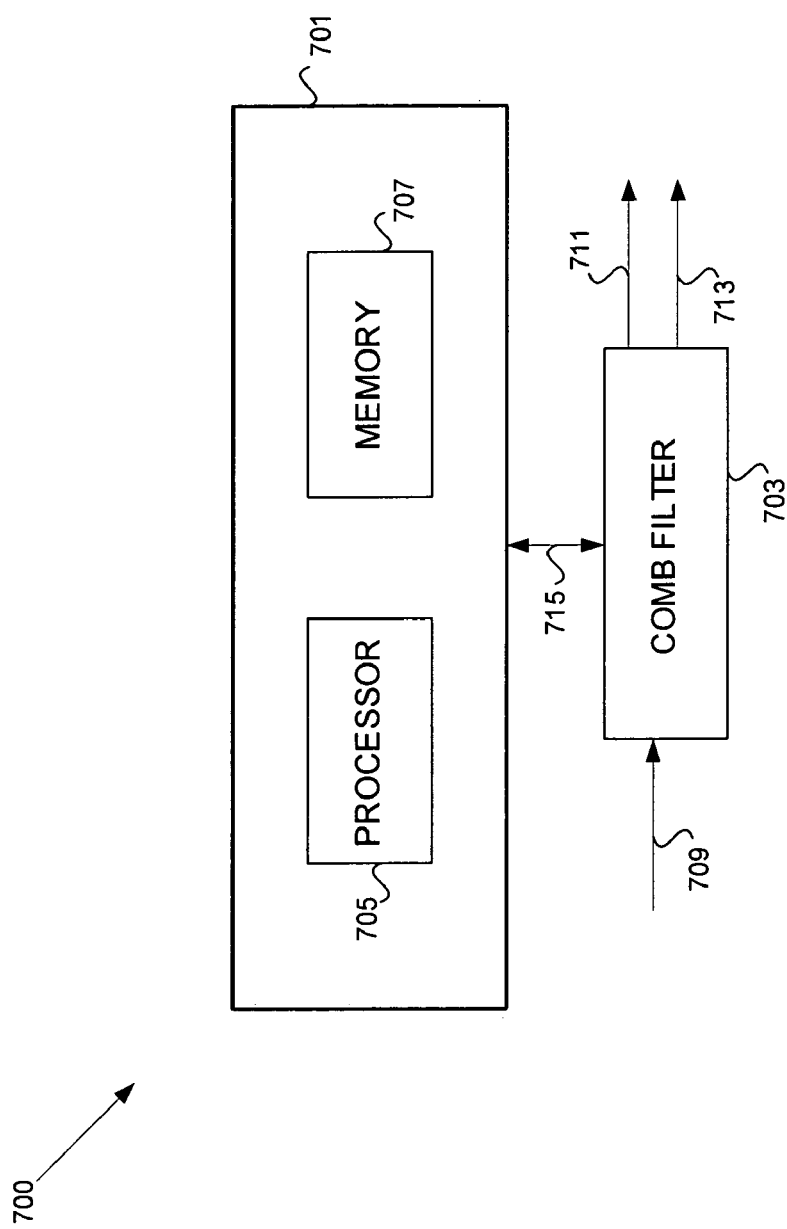
FIG. 7 is a block diagram of an exemplary system that may be used in accordance with an embodiment of the invention.

FIG. 7 is a block diagram of an exemplary system that may be used in accordance with an embodiment of the invention. Referring now to FIG. 7, the system 700 may comprise a host 701 and a comb filter 703. The host 701 may comprise a processor 705 and a host memory 707. The host 701 may be communicatively coupled to the comb filter 703 via an interface bus 715. In another embodiment of the present invention, the comb filter 703 may be a part of the host 701. The comb filter 703 may comprise a unidirectional or a bidirectional comb filter, for example.

In operation, the comb filter 703 may comprise suitable logic, circuitry and/or code and may be adapted to receive a video signal 709, separate the chroma and luma components, and then output the chroma component 711 and the luma component 713 separately. In addition, the comb 703 may be adapted to generate a 3D comb mesh value. The 3D comb value may indicate, for example, to what extent a composite video signal may be 3D and 2D combed. The processor 705 may be adapted to assign a weight to a 3D comb mesh value and may blend combing according to the assigned weight of the 3D comb mesh value. A first accumulating circuitry may accumulate the weighted 3D comb mesh value to generate accumulated mesh value. If the accumulated mesh value exceeds a saturation value, second circuitry may reduce the accumulated mesh value to the saturation value. If the 3D comb mesh value is smaller than a first threshold value, a reset circuitry may reset the accumulated mesh value to zero. Third circuitry may generate a multiplier according to the accumulated mesh value. If the accumulated mesh value is between a second threshold value and a third threshold value, the third circuitry may blend the multiplier. The third circuitry may vary blending over a determined range between the second threshold value and the third threshold value. If the accumulated mesh value is at most equal to the second threshold value, the third circuitry may set the multiplier to zero. If the accumulated mesh value is at least equal to the third threshold value, the third circuitry may set the multiplier to one. The processor 705 may blend combing according to the blended multiplier and the 3D comb mesh value. If the multiplier is zero, the processor 705 may disable 3D combing. If the multiplier is one, the processor 705 may 3D comb according to the 3D comb mesh value. The third circuitry may comprise an estimation circuitry. The second circuitry may comprise a saturation circuitry. The first circuitry may comprise an adder.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for combing a video signal, the method comprising:
   assigning a weight to a 3D comb mesh value, wherein said 3D comb mesh value indicates whether 3D combing may be used for combing the video signal; and
   blending 2D combing and 3D combing according to the assigned weight of the 3D comb mesh value.

2. The method according to claim 1, comprising accumulating the weighted 3D comb mesh value to generate accumulated mesh value.

3. The method according to claim 2, comprising reducing the accumulated mesh value to a saturation value, if the accumulated mesh value exceeds the saturation value.

4. The method according to claim 2, comprising resetting the accumulated mesh value to zero, if the 3D comb mesh value is smaller than a first threshold value.

5. The method according to claim 2, comprising generating a multiplier according to the accumulated mesh value.

6. The method according to claim 5, comprising blending the multiplier, if the accumulated mesh value is between a second threshold value and a third threshold value.

7. The method according to claim 6, comprising varying blending over a determined range between the second threshold value and the third threshold value.

8. The method according to claim 6, comprising setting the multiplier to zero, if the accumulated mesh value is at most equal to the second threshold value.

9. The method according to claim 6, comprising setting the multiplier to one, if the accumulated mesh value is at least equal to the third threshold value.

10. The method according to claim 6, comprising blending combing according to the blended multiplier and the 3D comb mesh value.

11. The method according to claim 5, comprising disabling 3D combing, if the multiplier is zero.

12. The method according to claim 5, comprising 3D combing according to the 3D comb mesh value, if the multiplier is one.

13. A machine-readable storage having stored thereon, a computer program having at least one code section for combing a video signal, the at least one code section being executable by a machine for causing the machine to perform steps comprising:
   assigning a weight to a 3D comb mesh value wherein said 3D comb mesh value indicates whether 3D combing may be used for combing the video signal; and
   blending 2D combing and 3D combing according to the assigned weight of the 3D comb mesh value.

14. The machine-readable storage according to claim 13, comprising code for accumulating the weighted 3D comb mesh value to generate accumulated mesh value.

15. The machine-readable storage according to claim 14, comprising code for reducing the accumulated mesh value to a saturation value, if the accumulated mesh value exceeds the saturation value.

16. The machine-readable storage according to claim 14, comprising code for resetting the accumulated mesh value to zero, if the 3D comb mesh value is smaller than a first threshold value.

17. The machine-readable storage according to claim 14, comprising code for generating a multiplier according to the accumulated mesh value.

18. The machine-readable storage according to claim 17, comprising code for blending the multiplier, if the accumulated mesh value is between a second threshold value and a third threshold value.

19. The machine-readable storage according to claim 18, comprising code for varying blending over a determined range between the second threshold value and the third threshold value.

20. The machine-readable storage according to claim 18, comprising code for setting the multiplier to zero, if the accumulated mesh value is at most equal to the second threshold value.

21. The machine-readable storage according to claim 18, comprising code for setting the multiplier to one, if the accumulated mesh value is at least equal to the third threshold value.

22. The machine-readable storage according to claim 18, comprising code for blending combing according to the blended multiplier and the 3D comb mesh value.

23. The machine-readable storage according to claim 17, comprising code for disabling 3D combing, if the multiplier is zero.

24. The machine-readable storage according to claim 17, comprising code for 3D combing according to the 3D comb mesh value, if the multiplier is one.

25. A system for combing a video signal, the system comprising:
   at least one processor that assigns a weight to a 3D comb mesh value, wherein said 3D comb mesh value indicates whether 3D combing may be used for combing the video signal; and
   the at least one processor blends 2D combing and 3D combing according to the assigned weight of the 3D comb mesh value.

26. The system according to claim 25, comprising first circuitry that accumulates the weighted 3D comb mesh value to generate accumulated mesh value.

27. The system according to claim 26, comprising second circuitry that reduces the accumulated mesh value to a saturation value, if the accumulated mesh value exceeds the saturation value.

28. The system according to claim 26, comprising reset circuitry that resets the accumulated mesh value to zero, if the 3D comb mesh value is smaller than a first threshold value.

29. The system according to claim 26, comprising a third circuitry that generates a multiplier according to the accumulated mesh value.

30. The system according to claim 29, wherein the third circuitry blends the multiplier, if the accumulated mesh value is between a second threshold value and a third threshold value.

31. The system according to claim 30, wherein the third circuitry varies blending over a determined range between the second threshold value and the third threshold value.

32. The system according to claim 30, wherein the third circuitry sets the multiplier to zero, if the accumulated mesh value is at most equal to the second threshold value.

33. The system according to claim 30, wherein the third circuitry sets the multiplier to one, if the accumulated mesh value is at least equal to the third threshold value.

34. The system according to claim 30, wherein the at least one processor blends combing according to the blended multiplier and the 3D comb mesh value.

35. The system according to claim 29, wherein the at least one processor disables 3D combing, if the multiplier is zero.

36. The system according to claim 29, wherein the at least one processor 3D combs according to the 3D comb mesh value, if the multiplier is one.

37. The system according to claim 29, wherein the third circuitry comprises an estimation circuitry.

38. The system according to claim 27, wherein the second circuitry comprises a saturation circuitry.

39. The system according to claim 26, wherein the first circuitry comprises an adder.

40. A method for combing a video signal, the method comprising:
assigning a weight to a 3D comb mesh value, wherein said 3D comb mesh value indicates whether 3D combing may be used for combing the video signal;
blending 2D combing and 3D combing according to the assigned weight of the 3D comb mesh value; and
accumulating the weighted 3D comb mesh value to generate accumulated mesh value.

41. The method according to claim 40, comprising reducing the accumulated mesh value to a saturation value, if the accumulated mesh value exceeds the saturation value.

42. The method according to claim 40, comprising resetting the accumulated mesh value to zero, if the 3D comb mesh value is smaller than a first threshold value.

43. The method according to claim 40, comprising generating a multiplier according to the accumulated mesh value.

44. The method according to claim 43, comprising blending the multiplier, if the accumulated mesh value is between a second threshold value and a third threshold value.

45. The method according to claim 44, comprising varying blending over a determined range between the second threshold value and the third threshold value.

46. The method according to claim 44, comprising setting the multiplier to zero, if the accumulated mesh value is at most equal to the second threshold value.

47. The method according to claim 44, comprising setting the multiplier to one, if the accumulated mesh value is at least equal to the third threshold value.

48. The method according to claim 44, comprising blending combing according to the blended multiplier and the 3D comb mesh value.

49. The method according to claim 43, comprising disabling 3D combing, if the multiplier is zero.

50. The method according to claim 43, comprising 3D combing according to the 3D comb mesh value, if the multiplier is one.

51. A machine-readable storage having stored thereon, a computer program having at least one code section for combing a video signal, the at least one code section being executable by a machine for causing the machine to perform steps comprising:
assigning a weight to a 3D comb mesh value, wherein said 3D comb mesh value indicates whether 3D combing may be used for combing the video signal;
blending 2D combing and 3D combing according to the assigned weight of the 3D comb mesh value; and
accumulating the weighted 3D comb mesh value to generate accumulated mesh value.

52. The machine-readable storage according to claim 51, comprising code for reducing the accumulated mesh value to a saturation value, if the accumulated mesh value exceeds the saturation value.

53. The machine-readable storage according to claim 51, comprising code for resetting the accumulated mesh value to zero, if the 3D comb mesh value is smaller than a first threshold value.

54. The machine-readable storage according to claim 51, comprising code for generating a multiplier according to the accumulated mesh value.

55. The machine-readable storage according to claim 54, comprising code for blending the multiplier, if the accumulated mesh value is between a second threshold value and a third threshold value.

56. The machine-readable storage according to claim 55, comprising code for varying blending over a determined range between the second threshold value and the third threshold value.

57. The machine-readable storage according to claim 55, comprising code for setting the multiplier to zero, if the accumulated mesh value is at most equal to the second threshold value.

58. The machine-readable storage according to claim 55, comprising code for setting the multiplier to one, if the accumulated mesh value is at least equal to the third threshold value.

59. The machine-readable storage according to claim 55, comprising code for blending combing according to the blended multiplier and the 3D comb mesh value.

60. The machine-readable storage according to claim 54, comprising code for disabling 3D combing, if the multiplier is zero.

61. The machine-readable storage according to claim 54, comprising code for 3D combing according to the 3D comb mesh value, if the multiplier is one.

62. A system for combing a video signal, the system comprising:
at least one processor that assigns a weight to a 3D comb mesh value, wherein said 3D comb mesh value indicates whether 3D combing may be used for combing the video signal;
the at least one processor blends 2D combing and 3D combing according to the assigned weight of the 3D comb mesh value; and
first circuitry that accumulates the weighted 3D comb mesh value to generate accumulated mesh value.

63. The system according to claim 62, comprising second circuitry that reduces the accumulated mesh value to a saturation value, if the accumulated mesh value exceeds the saturation value.

64. The system according to claim 62, comprising reset circuitry that resets the accumulated mesh value to zero, if the 3D comb mesh value is smaller than a first threshold value.

65. The system according to claim 62, comprising a third circuitry that generates a multiplier according to the accumulated mesh value.

66. The system according to claim 65, wherein the third circuitry blends the multiplier, if the accumulated mesh value is between a second threshold value and a third threshold value.

67. The system according to claim 66, wherein the third circuitry varies blending over a determined range between the second threshold value and the third threshold value.

68. The system according to claim 66, wherein the third circuitry sets the multiplier to zero, if the accumulated mesh value is at most equal to the second threshold value.

69. The system according to claim 66, wherein the third circuitry sets the multiplier to one, if the accumulated mesh value is at least equal to the third threshold value.

70. The system according to claim 66, wherein the at least one processor blends combing according to the blended multiplier and the 3D comb mesh value.

71. The system according to claim 65, wherein the at least one processor disables 3D combing, if the multiplier is zero.

72. The system according to claim 65, wherein the at least one processor 3D combs according to the 3D comb mesh value, if the multiplier is one.

73. The system according to claim 65, wherein the third circuitry comprises an estimation circuitry.

74. The system according to claim 63, wherein the second circuitry comprises a saturation circuitry.

75. The system according to claim 62, wherein the first circuitry comprises an adder.

* * * * *